Patented Feb. 25, 1947

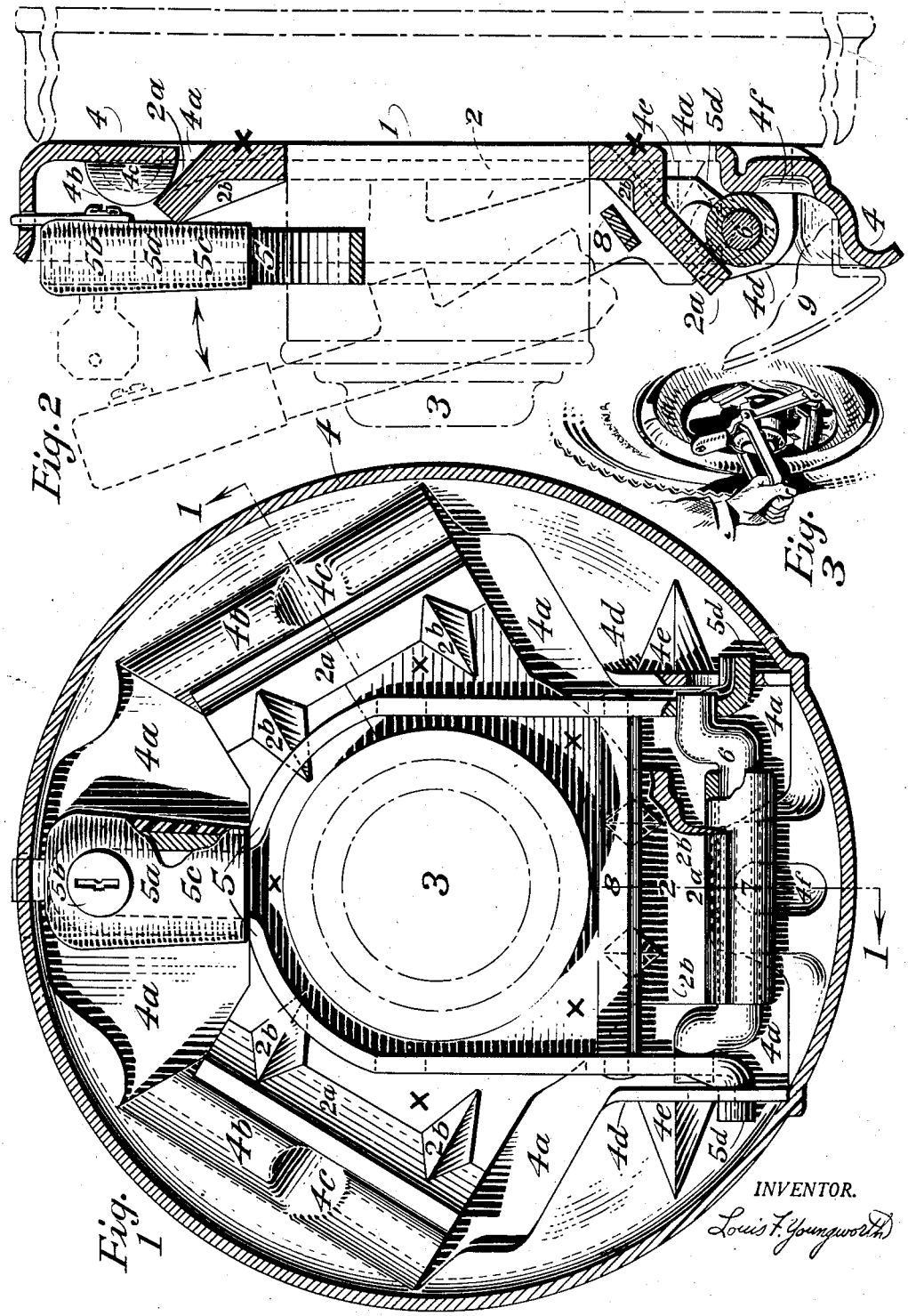

2,416,605

UNITED STATES PATENT OFFICE 2,416,605

QUICK-ACTING AND SELF-LOCKING WHEEL RETAINER

Louis Fabian Youngworth, Clifton, N. J., assignor to Joseph E. Youngworth, Clifton, N. J.

Application October 12, 1944, Serial No. 558,441

9 Claims. (Cl. 301—9)

This invention relates to a quick acting and self-locking wheel retainer. A device for universal use in securing wheels and the like and primarily for use on motor vehicles in mounting wheels securely to face of brake drum. Since the changing of wheels—generally due to a deflated tire—is the one frequent mechanical act on a motor vehicle that necessarily must be performed by the motorist, particularly in an emergency, it demands simplification.

An object of the invention is to eliminate the well known series of five or more bolts or nuts and dispense with the labor of jamming and unjamming of the bolts during the wheel changes. The prime object of this invention is to provide a device that is simple and expeditious in method, requiring but a split second to secure or unlock a wheel for changes.

Another object is to establish a controlled and consistently uniform securing pressure in place of the unpredictable pressure variations prevalent in the jamming of bolts.

An additional object is to provide said device at a minimum of cost, requiring the cheapest and fastest form of fabrication, one that is ideally suited for quantative production, i. e., blanking and forming on a punch press.

As a further advantage, the device firmly locks wheel to drum automatically. It may also be added that no tool is necessary and the use of but one hand is required for securing or releasing the wheel.

A preferred embodiment of the invention is illustrated in the accompanying drawing, of which:

Fig. 1 shows a plan view of engaged device, as seen with hub cap removed. The web of wheel disk is sectioned on the perimetrical area to which the subject device is related.

Fig. 2 is a side elevation view sectioned along lines 1—1 of the device engaged.

Fig. 3 is a perspective view of the device supplemental to Fig. 2.

Referring more specifically to the drawing, the numeral 1 indicates a face of the usual brake drum of a motor vehicle, on which the wheel is mounted. Numeral 2, a buttress plate of my invention, is located concentrically and is permanently spot welded or riveted to the drum face. The buttress plate, through the center of which a hole has allowed for projection of an extended axle 3, comprises three equally spaced flanges $2a$, $2a$, $2a$ with one being offset. The flanges project at uniformly inclined angles and are provided with two indented ribs $2b$, $2b$ to brace each flange.

The web or wall 4 of the wheel disk has a suitably large opening $4a$, $4a$ surrounding the said plate. At two chordal sections of this opening the immediate edge of the web is corrugated to form two elongated beads $4b$, $4b$ that wedge under the projected flanges of plate. The beads are parallel and concentric in relation to the flanged plate to locate wheel for same. At the center of each bead a receding rib $4c$ is employed for reinforcement. The edge of web at the opening is bent up from the original plane to right angled positions, forming two brackets $4d$, $4d$ with angular ribs $4e$, $4e$ for support. Each bracket contains an opening that serves as a pivotal point in hinging the take-up lever 5. Also at said opening, a chordal segment of web remaining on the developed plane, centrally between the two brackets, is formed into a ribbed bearing block $4f$ as shown. All features stated under numeral 4 are web formations of the wheel disk and constitute a single unit. The take-up lever 5 is a strap folded in two, forming a handle $5a$ at the fold, in which a lock $5b$ is borne. A rubber cap $5c$ sheaths handle for cushioning. The two straddling ends of the lever form pintle shapes $5d$, $5d$ that are introduced into holes of brackets for pivoting the lever. Just above this point two aligned holes in the lever, bear the clamping bar 6 which is centrally encased with a roller bearing sleeve 7. A strip 8 connecting the opposite sides of the handle $5a$ is provided as a support.

*Operation.*—The handle is drawn from its engaged position, whereby the wheel is completely released and is readily lifted free.

*Re-mounting.*—The wheel is hung onto the two uniform flanges $2a$ and the member 6 engaged with the remaining flange $2a$ as the completely released lever is drawn to its engaged location. The wheel is automatically positioned and rigidly locked upon which no amount of jarring or vibration can loosen same. The lock is optionally provided for assurance against theft. A limited toggle movement of the clamping bar to generate leverage in multiplying the applied hand pressure is employed, whereby a tremendous holding capacity is developed in wedging the wheel to drum face. The wheel is rigidly secured with a pressure that exceeds the greatest possible load that may be exerted on the wheel, radially. Thus, the rigidity of the rotating wheel in transit is assured. When the apex of the arcuated movement in the pivotal take-up is passed locking takes place as the stressed lever is urged to the drum face.

The accompanying drawing is a general illustration of the device which is designed to fit within the usual range allotted to the hub capped area of wheels, without altering its general appearance. However, it is to be understood that this area may readily be increased for a greater leverage range. For the greater the leverage, the greater is the ratio of developed pressure. A pressure ratio, in the excess of 75 to 1, with a holding pressure of well over a ton can easily be accomplished. Particularly with an additional lever for compound leverage, as in Fig. 3, adaptable for commercial vehicles of heavier tonnage, with levers being of a forged type.

The bases of the brackets, beads and bearing block are all in the same plane, a flat surface that rests solidly against the drum for rigidity. From this said plane, the web folds to a right angle on a complete perimeter forming a pan, the base of which butts firmly against the drum face, providing a 100% bearing and sealing surface, in housing the device when covered with the hub cap 9, which is held in the usual manner. The wall of said pan also supports the brackets at 4g, 4g against radial thrusts from lever. The wheel is always mounted in one position with respect to the weight irregularities of the wheel, i. e., valve, tire seam, etc., so that the entire wheel may be dynamically balanced in the design of my device.

Rearrangement or modification of said features in design, herein disclosed may be resorted to without departing from the scope of the appended claims.

Having described my invention, what I claim and desire to secure by Letters Patent is:

1. In a wheel securing means, rotatably mounted means having spaced projections, a wheel having securing means rigid therewith adapted to be engaged with some of said projections, a lever mounted on said wheel and means operated by said lever to engage another of said projections, the engagement of said lever operated means and said projection holding said securing means on said wheel engaged with said projections.

2. In a wheel securing means, rotatably mounted means having spaced projections, a wheel having fixed projections adapted to be engaged with a plurality of said spaced projections on said rotatably mounted means, a lever pivotally mounted on said wheel and means pivotally mounted on said lever and adapted to be engaged with others of said projections on said rotatably mounted means by operation of said lever to hold said fixed projections on said wheel engaged with said projections on said rotatably mounted means.

3. In a wheel securing means, a brake drum, a buttress plate secured to said drum and having spaced angularly disposed projecting flanges, a wheel disk having projecting ribs adapted to be engaged with a plurality of said flanges and means mounted on said wheel disk and adapted to engage another of said flanges, the engagement of said means and said flange securing said ribs in engagement with said flanges.

4. In a wheel securing means, a brake drum, a buttress plate secured to said drum and having spaced angularly disposed flanges inclined to said plate, a wheel disk having projecting ribs adapted to be engaged beneath a plurality of said flanges, a lever pivotally mounted on said wheel disk and a bar operated by said lever and adapted to engage beneath another of said flanges to secure said wheel engaged to said plate.

5. In a car wheel securing means, a rotatable plate, a buttress plate secured to said rotatable plate and having spaced angularly disposed flanges inclined to said buttress plate, a wheel disk having projecting ribs adapted to be engaged beneath a plurality of said flanges, a lever pivotally mounted on said wheel disk and wedging means operated by said lever and engaging beneath another of said flanges to secure said wheel engaged to said buttress plate.

6. In a car wheel securing means, rotatable means, a buttress plate secured to said rotatable means and having spaced angularly-disposed flanges inclined to said buttress plate, a wheel disk having projecting ribs adapted to be engaged beneath a plurality of said flanges, a lever pivotally mounted on said wheel disk, and wedging means pivotally mounted on said lever and having the body thereof offset from the pivotal axis thereof, said wedging means being arranged to engage beneath another of said flanges to secure said wheel to said plate.

7. In a car wheel securing means, rotatable means, a buttress plate secured to said rotatable means and having spaced angularly-disposed flanges inclined to said buttress plate, a wheel disk having projecting ribs adapted to be engaged beneath a plurality of said flanges, a lever having separated arm portions pivotally mounted in said wheel disk, a bar adapted to engage another of said flanges pivotally mounted in said separated arm portions and having its center portion offset from its pivotal axis whereby pressure of said flange on said bar tends to hold said lever in locking position.

8. In a wheel securing means, rotatably mounted means, a buttress plate secured to said rotatably mounted means and having spaced angularly-disposed flanges inclined to said buttress plate, a wheel having projecting ribs adapted to engage with a plurality of said flanges and means pivotally mounted on said wheel comprising a bar adapted to engage another of said flanges and means for operating said bar to force said ribs into engagement with said flanges.

9. In a wheel securing means, rotatably mounted means, a buttress plate secured to said rotatably mounted means and having spaced angularly-disposed flanges inclined to said buttress plate, a wheel having projecting ribs adapted to engage with a plurality of said flanges, and means pivotally mounted on said wheel comprising a bar adapted to engage another of said flanges and means for operating said bar to force said ribs into engagement with said flanges and means for holding said operating means with said bar engaged with said flange.

LOUIS FABIAN YOUNGWORTH.

REFERENCES CITED

The following references are of record in the file of this patent:

UNITED STATES PATENTS

| Number | Name | Date |
|---|---|---|
| 1,409,777 | Rapson | Mar. 14, 1922 |
| 1,909,286 | Lebel | May 16, 1933 |
| 2,026,586 | McVeagh | Jan. 7, 1936 |
| 1,651,105 | Schenken | Nov. 29, 1927 |
| 2,018,190 | Robinson | Oct. 22, 1935 |